United States Patent
Koshkin et al.

(10) Patent No.: US 9,843,746 B2
(45) Date of Patent: Dec. 12, 2017

(54) IMAGE SENSOR COMBINING HIGH DYNAMIC RANGE TECHNIQUES

(71) Applicant: AltaSens, Inc., Westlake Village, CA (US)

(72) Inventors: Ilya Koshkin, Woodland Hills, CA (US); Lester Joseph Kozlowski, Simi Valley, CA (US); Anders Kongstad Petersen, Carpinteria, CA (US); Jeffrey Alan McKee, Springdale, UT (US)

(73) Assignee: ALTASENS, INC., Westlake Village, CA (US)

( * ) Notice: Subject to any disclaimer, the term of this patent is extended or adjusted under 35 U.S.C. 154(b) by 0 days.

(21) Appl. No.: 15/145,220

(22) Filed: May 3, 2016

(65) Prior Publication Data
US 2017/0324913 A1    Nov. 9, 2017

(51) Int. Cl.
*H04N 5/355* (2011.01)
*H04N 5/374* (2011.01)

(52) U.S. Cl.
CPC .............. *H04N 5/355* (2013.01); *H04N 5/374* (2013.01)

(58) Field of Classification Search
CPC ............................... H04N 5/355; H04N 5/374
See application file for complete search history.

(56) References Cited

U.S. PATENT DOCUMENTS

| | | | |
|---|---|---|---|
| 8,605,177 B2 | 12/2013 | Rossi et al. | |
| 2008/0174671 A1* | 7/2008 | Tanaka | H04N 5/2354 348/222.1 |
| 2014/0184894 A1* | 7/2014 | Motta | H04N 5/2353 348/362 |
| 2014/0320695 A1* | 10/2014 | Ozawa | H04N 5/35563 348/229.1 |
| 2015/0201118 A1* | 7/2015 | Lee | H04N 5/2355 348/222.1 |
| 2015/0207974 A1* | 7/2015 | Mody | H04N 5/345 348/296 |

* cited by examiner

*Primary Examiner* — Gevell Selby
(74) *Attorney, Agent, or Firm* — Medley, Behrens & Lewis, LLC

(57) ABSTRACT

Various technologies described herein pertain to combining high dynamic range techniques to enable rendering higher dynamic range scenes with an image sensor. The image sensor can implement a combination of spatial exposure multiplexing and temporal exposure multiplexing, for example. By way of another example, the image sensor can implement a combination of spatial exposure multiplexing and dual gain operation. Pursuant to another example, the image sensor can implement a combination of temporal exposure multiplexing and dual gain operation. In accordance with yet another example, the image sensor can implement a combination of spatial exposure multiplexing, temporal exposure multiplexing, and dual gain operation.

14 Claims, 14 Drawing Sheets

FIG. 2

IMAGE SENSOR COMBINING HIGH DYNAMIC RANGE TECHNIQUES

BACKGROUND

An image sensor is a device that can convert an optical image into an electronic signal. Image sensors are oftentimes utilized in still cameras, video cameras, video systems, and other imaging devices. Cameras and other imaging devices commonly employ either a charge-coupled device (CCD) image sensor or a complementary metal-oxide-semiconductor (CMOS) image sensor.

CMOS image sensors include an array of pixels, each of which can comprise a photodetector. CMOS image sensors also include circuitry to convert light energy to an analog voltage and additional circuitry to convert the analog voltage to digital data. A CMOS image sensor can be an integrated circuit (e.g., a system on chip (SoC)) that includes various analog, digital, and/or mixed-signal components for capturing light and processing imaging related information. For example, components integrated into the CMOS image sensor oftentimes include a processor module (e.g., microprocessor, microcontroller, or digital signal processor (DSP) core), memory, analog interfaces (e.g., analog-to-digital converters, digital-to-analog converters), and so forth.

Visible imaging systems implemented using CMOS image sensors can reduce costs, power consumption, and noise while improving resolution. For instance, cameras can use CMOS image sensors that efficiently marry low-noise image detection and signal processing with multiple supporting blocks that can provide timing control, clock drivers, reference voltages, analog to digital conversion, digital to analog conversion, key signal processing elements, and the like. High-performance video cameras can thereby be assembled using a CMOS integrated circuit supported by few components including a lens and a battery, for instance. Accordingly, by leveraging CMOS image sensors, camera size can be decreased and battery life can be increased. Also, dual-use cameras have emerged that can employ CMOS image sensors to alternately produce high-resolution still images or high definition (HD) video.

When capturing an image of a scene using an image sensor, lighting conditions can vary. For instance, the scene may be too dark, too light, too diverse, or too dynamic, such as when a cloud quickly blocks the sun. To adjust to different lighting conditions, it is desirable to have an image sensor with a wide dynamic range, where the image sensor can adjust to current lighting conditions to enhance details in the image. Yet, dynamic ranges of many conventional image sensors are oftentimes not high enough, which leads to these image sensors being unable to capture some details in a scene. By way of illustration, some traditional image sensors, when capturing an image of an outdoor scene in bright light, may be unable to satisfactorily render a portion of the scene in a shadow (e.g., details of the scene in the shadow may be rendered as pitch black) and/or a portion of the scene in high light (e.g., details of the scene in high light may be rendered as white) due to the typical dynamic ranges of such traditional image sensors.

SUMMARY

Described herein are various technologies that pertain to combining high dynamic range techniques to enable rendering higher dynamic range scenes with an image sensor. Examples of the high dynamic range techniques that can be combined by the image sensor include spatial exposure multiplexing, temporal exposure multiplexing, and/or dual gain operation. However, other high dynamic range techniques can additionally or alternatively be supported by the image sensor. By way of illustration, typical image sensors oftentimes output images with a dynamic range between 8 and 14 bits. In contrast, by combining two or more high dynamic range techniques as described herein, an image sensor can allow for generating an image with a 20+ bit dynamic range, for example. Moreover, combining the high dynamic range techniques can decrease detrimental impact caused by motion artifacts and/or decrease power consumption as compared to some conventional approaches for enhancing dynamic range.

According to an example, the image sensor can implement a combination of spatial exposure multiplexing and temporal exposure multiplexing. By way of another example, the image sensor can implement a combination of spatial exposure multiplexing and dual gain operation. Pursuant to another example, the image sensor can implement a combination of temporal exposure multiplexing and dual gain operation. In accordance with yet another example, the image sensor can implement a combination of spatial exposure multiplexing, temporal exposure multiplexing, and dual gain operation.

As described herein in accordance with various embodiments, the image sensor includes a pixel array that comprises pixels. Moreover, the image sensor includes a timing controller configured to control exposure times of the pixels in the pixel array. The image sensor further includes a readout circuit configured to read out signals from the pixels in the pixel array and an analog-to-digital converter configured to convert the signals from the pixels to pixel values for the pixels (e.g., digital pixel values). An output frame can be generated (e.g., by an image signal processor included in the image sensor or a separate image signal processor in communication with the image sensor) based on the pixels values for the pixels.

In accordance with various embodiments, the image sensor can implement a combination that includes at least spatial exposure multiplexing and temporal exposure multiplexing. Accordingly, the timing controller can be configured to control a first subset of the pixels in the pixel array to have a first exposure time during a first time period and configured to control a second subset of the pixels in the pixel array to have a second exposure time during the first time period, where a first frame of an input image stream can be captured during the first time period. Moreover, the timing controller can be configured to control the first subset of the pixels in the pixel array to have a third exposure time during a second time period and configured to control the second subset of the pixels in the pixel array to have a fourth exposure time during the second time period, where a second frame of the input image stream can be captured during the second time period. Further, the first exposure time, the second exposure time, the third exposure time, and the fourth exposure time differ from each other. The readout circuit can be configured to read out signals from the pixels in the pixel array for the first frame and the second frame of the input image stream. Moreover, the analog-to-digital converter can be configured to convert the signals to pixel values for the first frame and the second frame of the input image stream. Further, an output frame can be generated based on the pixel values for the first frame and the second frame of the input image stream.

According to various embodiments, the image sensor can implement a combination that includes dual gain operation as well as at least one of spatial exposure multiplexing or temporal exposure multiplexing. Thus, the timing controller can be configured to control the exposure times of the pixels at least one of temporally or spatially such that an input image stream has two or more differing exposure times. The readout circuit can be configured to read out signals from the pixels in the pixel array for the input image stream having the two or more differing exposure times. The readout circuit can further be configured to amplify the signals read out from the pixels in the pixel array by a first analog gain to output first amplified signals for the input image stream having the two or more differing exposure times. Moreover, the readout circuit can be configured to amplify the signals read out from the pixels in the pixel array by a second analog gain to output second amplified signals for the input image stream having the two or more differing exposure times, where the first analog gain differs from the second analog gain. The analog-to-digital converter of the image sensor can be configured to convert the first amplified signals to first amplified pixel values for the input image stream having the two or more differing exposure times. The analog-to-digital converter can further be configured to convert the second amplified signals to second amplified pixel values for the input image stream having the two or more differing exposures times. An output frame can be generated based on the first amplified pixel values for the input image stream having the two or more differing exposure times and the second amplified pixel values for the input image stream having the two or more differing exposure times.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 2-3 illustrate exemplary patterns of pixels in a pixel array for spatial exposure multiplexing.

DETAILED DESCRIPTION

Figure 1:
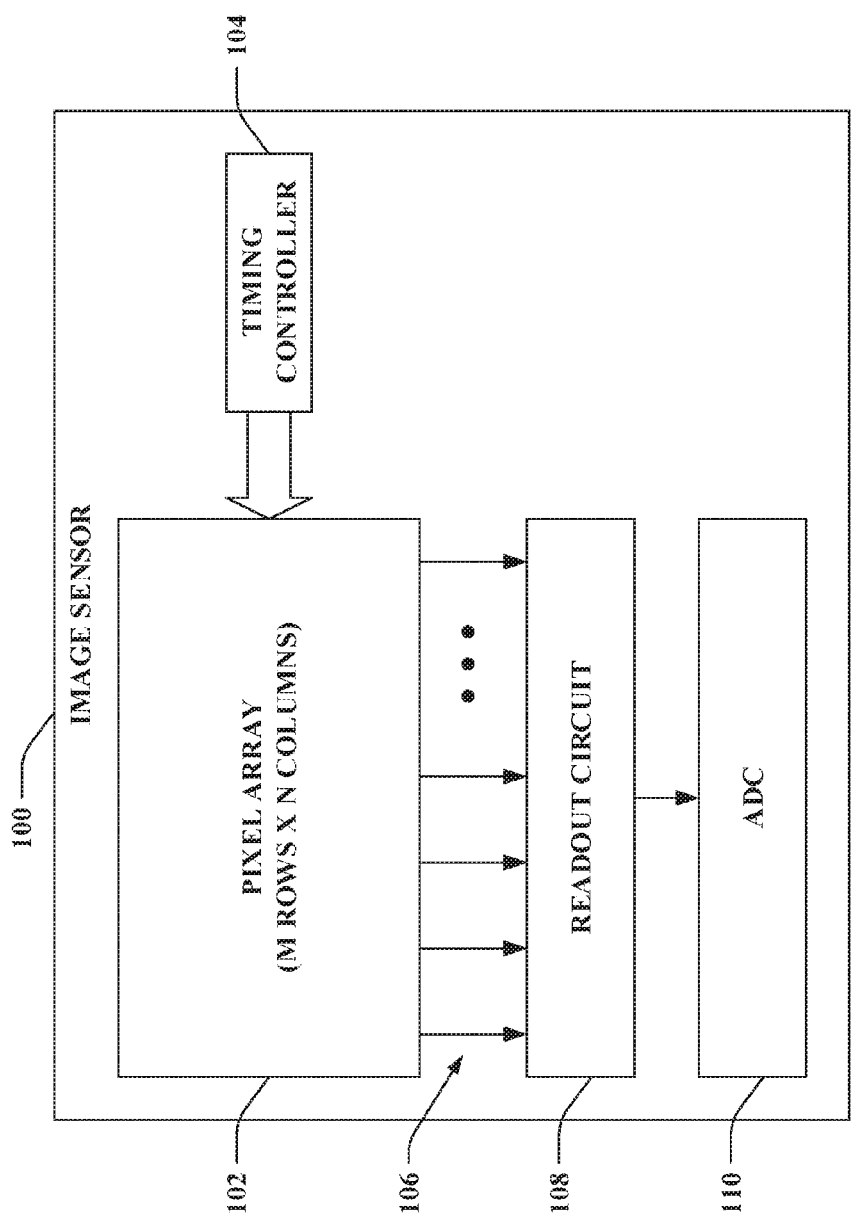
FIG. 1 illustrates a block diagram of an exemplary image sensor.

Various technologies pertaining to combining high dynamic range techniques to enable rendering higher dynamic range scenes with an image sensor (as compared to conventional high dynamic range approaches) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates an exemplary image sensor 100. The image sensor 100 can be a CMOS image sensor system on chip. According to various examples, a camera, a video system, a medical imaging device, an industrial imaging device, a microscope, or the like can include the image sensor 100. Examples of a camera that can include the image sensor 100 include a digital camera, a videoconference camera, a broadcast video camera, a cinematography camera, a surveillance video camera, a handheld video camera, a camera integrated into a computing device, a high dynamic range implementation of a camera, and so forth. Moreover, examples of computing devices (which can include the image sensor 100 as part of a camera) include a desktop computing device, a mobile computing device (e.g., a laptop computing device, a mobile telephone, a smartphone, a tablet computing device, a wearable computing device, a handheld computing device, a portable gaming device, a personal digital assistant), a gaming console, an in-vehicle communications and infotainment system, or the like.

The image sensor 100 includes a pixel array 102. The pixel array 102 can include M rows and N columns of pixels, where M and N can be any integers. Each pixel in the pixel array 102 can comprise a photodetector (e.g., photogate, photoconductor, photodiode) that overlays a substrate to generate a photo-generated charge. Each pixel can also include a source follower transistor and a floating diffusion region connected to a gate of the source follower transistor. Accordingly, charge generated by the photodetector can be sent to the floating diffusion region to convert the charge to a voltage that is readable by transistor elements and can be processed by signal processing circuits, either within the pixel or in other parts of the pixel array 102 (or other parts of the image sensor 100). Further, each pixel can include a transistor for transferring charge from the photodetector to the floating diffusion region and another transistor for resetting the floating diffusion region to a predetermined charge level prior to charge transference; yet, it is to be appreciated that the claimed subject matter is not limited to the foregoing, as other pixel architectures are intended to fall within the scope of the hereto appended claims.

The image sensor 100 includes a timing controller 104 configured to control exposure times of the pixels in the pixel array 102. The timing controller 104 can be configured to control the exposure times of the pixels temporally and/or spatially such that an input image stream captured by the image sensor 100 has two or more differing exposure times. The timing controller 104 can spatially control the exposure times of the pixels by controlling a first subset of the pixels in the pixel array 102 and a second subset of the pixels in the pixel array 102 to have differing exposure times during a common time period. As described herein, the first subset of the pixels in the pixel array 102 and the second subset of the pixels in the pixel array 102 are disjoint. Additionally or alternatively, the timing controller 104 can temporally control the exposure times of the pixels by controlling the pixels in the pixel array 102 (or a subset of such pixels) to have differing exposure times during differing time periods (e.g., during which differing frames in the input image stream are captured).

As used herein, the term "exposure time" refers to a length of time. To provide a high dynamic range, the pixel array 102 can include pixels that have differing exposure times during a common time period (e.g., to enable implementing spatial exposure multiplexing). Additionally or alternatively, the pixels in the pixel array 102 (or a subset of such pixels) can have differing exposure times during different time periods (e.g., to enable implementing temporal exposure multiplexing). According to an example, the exposure times set by the timing controller 104 can be programmatically varied, and thus, a dynamic range of the image sensor 100 can be altered. However, pursuant to other examples, it is contemplated that the exposure times controlled by the timing controller 104 can be static.

According to an example, the timing controller 104 can employ two distinct exposure times (e.g., a long exposure time and a short exposure time) if one of spatial exposure multiplexing or temporal exposure multiplexing is implemented by the image sensor 100. Following this example, it is contemplated that an exposure ratio of 16:1 or 32:1 may be used by the timing controller 104, where the exposure ratio specifies a ratio between the long exposure time and the short exposure time. The long exposure time can enable rendering bright parts of a scene, and the short exposure time can enable rendering dark parts of the scene. For instance, a 16:1 exposure ratio can enable adding 4 bits of dynamic range to a resulting output image (relative to an image sensor that uses a single exposure time). However, it is to be appreciated that the claimed subject matter is not limited to the foregoing example. Pursuant to another example, the timing controller 104 can utilize four distinct exposure times if both spatial exposure multiplexing and temporal exposure multiplexing are implemented by the image sensor 100.

The image sensor 100 can also include read buses 106 and a readout circuit 108. The readout circuit 108 can be configured to read out signals (e.g., voltages) from the pixels in the pixel array 102. The signals can be transferred from the pixels in the pixel array 102 via the read buses 106 to the readout circuit 108. The image sensor 100 can include N read buses 106, where each read bus can be associated with a respective column of the pixel array 102. By way of another example, columns of the pixel array 102 can share read buses 106, and thus, the image sensor 100 can include fewer than N read buses 106. Pursuant to yet another example, each column of the pixel array 102 can be associated with more than one read bus, and thus, the image sensor 100 can include more than N read buses 106.

The readout circuit 108 can include voltage amplifier(s) that amplify the signals (e.g., voltages) read out from the pixels of the pixel array 102. For example, the readout circuit 108 can include N voltage amplifiers (e.g., a voltage amplifier for each column of the pixel array 102). According to another example, the readout circuit 108 can include fewer than N voltage amplifiers (e.g., columns of the pixel array 102 can share voltage amplifiers). In accordance with yet another example, the readout circuit 108 can include more than N voltage amplifiers.

Moreover, pursuant to an example, the signals read out from the pixels of the pixel array 102 can each be amplified by more than one voltage amplifier of the readout circuit 108 in parallel (e.g., to support dual gain operation). Following this example, a signal read out from a particular pixel in the pixel array 102 can be amplified by two voltage amplifiers in parallel (e.g., a high gain amplifier and a low gain amplifier). Thus, the signal from the particular pixel can be processed by the readout circuit 108 in parallel through two signal chains with different analog gains. Accordingly, following this example, the readout circuit 108 can include a plurality of signal chains for each column of the pixel array 102 to enable dual gain operation.

The readout circuit 108 can further include sampling capacitors. Sampling capacitors can be respectively coupled to corresponding outputs of the voltage amplifiers of the readout circuit 108. By way of illustration, an amplified signal outputted by a particular voltage amplifier of the readout circuit 108 can be provided to a corresponding sampling capacitor.

The image sensor 100 further includes an analog-to-digital converter (ADC) 110. The analog-to-digital converter 110 can be configured to convert the signals read out by the readout circuit 108 to pixel values (e.g., digital pixel values) for the pixels in the pixel array 102. Thus, a voltage read out from a particular pixel of the pixel array 102 by the readout circuit 108 can be converted to a digital pixel value for the particular pixel by the analog-to-digital converter 110. According to another illustration, amplified signals memorized into sampling capacitors of the readout circuit 108 can be converted by the analog-to-digital converter 110 to corresponding pixel values. While many of the examples set forth herein describe an image sensor that includes one analog-to-digital converter, it is contemplated that these examples can be extended to scenarios where a plurality of analog-to-digital converters are included in an image sensor, up to and including an analog-to-digital converter per pixel.

The image sensor 100 supports combining high dynamic range techniques to enable rendering higher dynamic range scenes as compared to conventional approaches. Examples of the high dynamic range techniques that can be combined by the image sensor 100 include spatial exposure multiplexing, temporal exposure multiplexing, and/or dual gain operation. Thus, multiple pixel values resulting from different exposure times and/or different gains (e.g., due to a combination of high dynamic range techniques being implemented) can be stitched together to generate an output frame having increased dynamic range. While these three high dynamic range techniques are described herein, it is contemplated that other high dynamic range techniques can additionally or alternatively be supported by the image sensor 100.

Spatial exposure multiplexing varies exposure times between different pixels of the same frame. Thus, neighboring pixels of different exposure times can be stitched together to render a higher dynamic range, albeit at a loss of spatial resolution. If spatial exposure multiplexing is implemented by the image sensor 100 in combination with at least one other high dynamic range technique, two different exposure times can be used in the same frame to obtain a desired dynamic range (e.g., 20+ bit dynamic range). In contrast, if spatial exposure multiplexing were to be implemented without another high dynamic range technique, then three or more exposure times may be used in the same frame to obtain the desired dynamic range; yet, as the number of exposure times used in one frame increases, the spatial resolution is detrimentally impacted.

Temporal exposure multiplexing utilizes two or more successive frames (e.g., snapshots) captured using different exposure times, where the frames can be stitched together into a higher dynamic range scene. For example, if two 12 bit images taken with a 16:1 exposure ratio are stitched together, a resulting output image can render up to 16 bits of dynamic range. If temporal exposure multiplexing were to be implemented without another high dynamic range technique, then three or more successive frames (each using a different exposure time) may be stitched together to obtain a desired dynamic range (e.g., 20+ bit dynamic range). However, this approach leads to increasing the frame rate at which an image sensor runs (e.g., the image sensor can be run three times faster than a resulting output video stream if three successive frames are stitched together), which shortens the integration time for each individual frame, increases power consumption for the image sensor, and increases a likelihood of motion artifacts being captured in the frames being combined.

Dual gain operation allows for the image sensor 100 to output two frames of data simultaneously at different analog gains. The two frames having the two gains can subsequently be stitched together for a higher dynamic range image.

According to an illustration, conventional image sensors commonly output images with dynamic ranges between 8 and 14 bits depending on designs of the image sensors. These typical dynamic ranges can limit abilities of the conventional image sensors to render full dynamic ranges of high contrast scenes. On the contrary, by combining two or more high dynamic range techniques as described herein, the image sensor 100 can allow for generating an output image with a 20+ bit dynamic range, for example, to achieve at least 120 dB dynamic range (e.g., such dynamic range may be needed for automotive applications).

The image sensor 100 can yield at least four stitchable fields of pixel values from no more than two frames of an input image stream, where the stitchable fields can be combined to generate an output frame. According to an example, the image sensor 100 can implement a combination of spatial exposure multiplexing and temporal exposure multiplexing. By way of another example, the image sensor 100 can implement a combination of spatial exposure multiplexing and dual gain operation. Pursuant to another example, the image sensor 100 can implement a combination of temporal exposure multiplexing and dual gain operation. In accordance with yet another example, the image sensor 100 can implement a combination of spatial exposure multiplexing, temporal exposure multiplexing, and dual gain operation.

Figure 2:
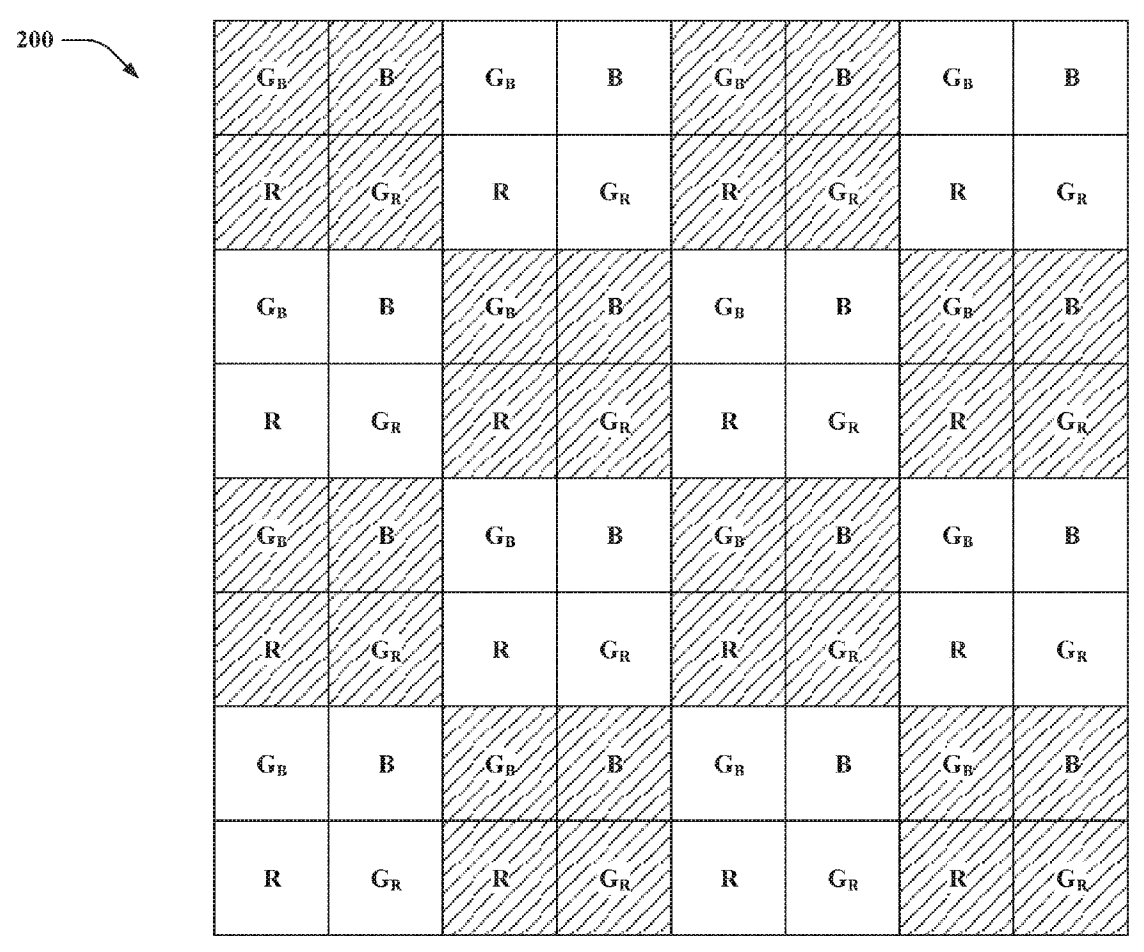
Figure 3:
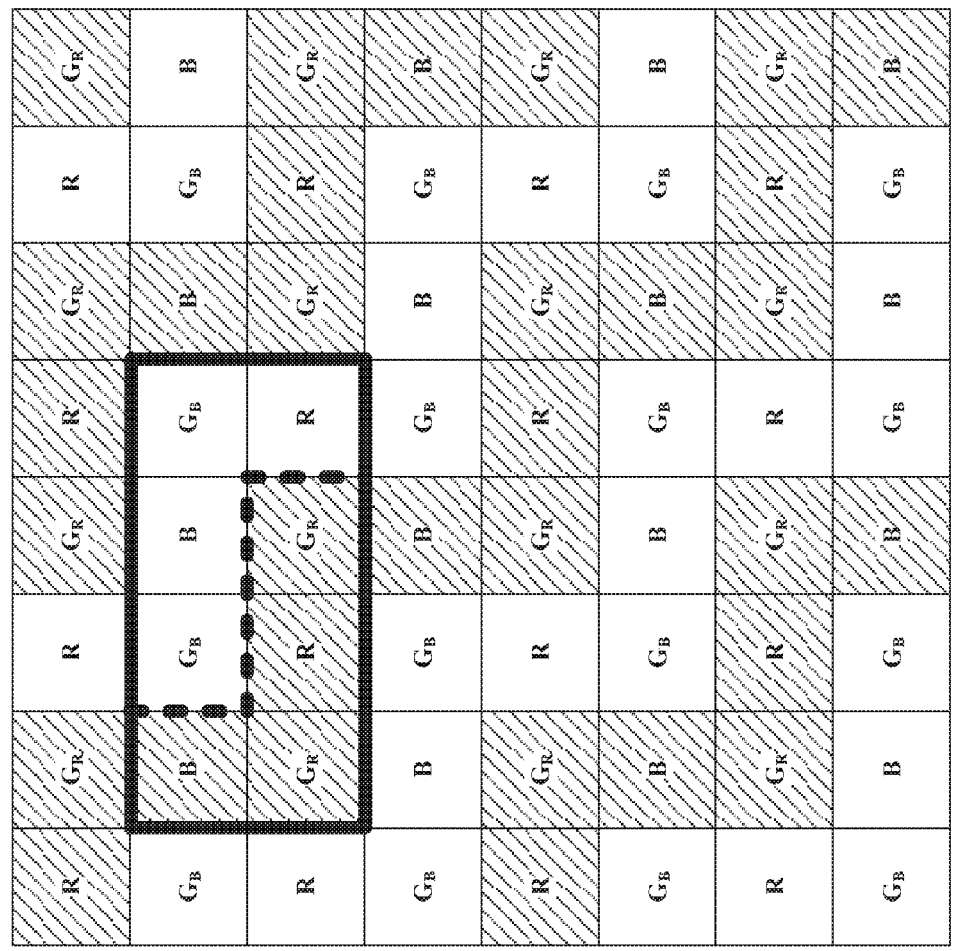

If the image sensor 100 implements spatial exposure multiplexing, various exposure time patterns for pixels in the pixel array 102 are intended to fall within the scope of the hereto appended claims. Examples of the patterns are depicted in FIGS. 2-3. In particular, FIG. 2 shows an exemplary checkerboard pattern, and FIG. 3 shows an exemplary zigzag pattern.

FIGS. 2-3 illustrate differing examples of portions of the pixel array 102. The pixel array 102 includes pixels in differing Bayer domains. The pixel array 102 includes four types of pixels that belong to differing Bayer domains. The four types of pixels include red pixels (R), green pixels next to red pixels ($G_R$) (e.g., in the same row as the red pixels), blue pixels (B), and green pixels next to the blue pixels ($G_B$) (e.g., in the same row as the blue pixels). The red pixels (R) include photodiodes operative based upon obtaining red light. The green pixels ($G_R$) and the green pixels ($G_B$) include photodiodes that operate based upon obtaining green light. Further, the blue pixels (B) include photodiodes that operate based upon obtaining blue light. The green pixels, ($G_B$) and ($G_R$), are differentiated from each other based upon the alternating color in the respective row, and such differentiation provides a manner of identifying four separate Bayer domains.

The pixel array 102 can include substantially any number of pixels. The portion 200 of the pixel array 102 illustrated in FIG. 2 and the portion 300 of the pixel array 102 illustrated in FIG. 3 show layouts of the four types of pixels that belong to the disparate Bayer domains that can be utilized across the pixel array 102. However, it is to be appreciated that other layouts are intended to fall within the scope of the hereto appended claims.

Turning to FIG. 2, illustrated is a portion 200 of the pixel array 102 that includes a first subset of the pixels having a first exposure time and a second subset of the pixels having a second exposure time during a common time period (e.g., during which a single contiguous frame of an input image stream is captured), where the first exposure time differs from the second exposure time. The subsets of the pixels of the pixel array 102 having the respective exposure times (e.g., integration times) are spatially arranged according to a checkerboard pattern in FIG. 2, where alternating blocks of pixels are formed. The differing exposure times can be controlled by the timing controller 104 as described herein to support spatial exposure multiplexing; thus, the timing controller 104 can control the first subset of the pixels in the pixel array 102 to have the first exposure time and the second subset of the pixels in the pixel array 102 to have the second exposure time during the common time period.

The first subset of the pixels in the pixel array 102 can include first rectangular blocks of pixels (depicted as shaded boxes in FIG. 2) triggered for the first exposure time. Moreover, the second subset of the pixels in the pixel array 102 can include second rectangular blocks of pixels (depicted as white boxes in FIG. 2) triggered for the second exposure time. The first rectangular blocks of pixels and the second rectangular blocks of pixels can alternate and repeat across at least a portion of the pixel array 102 as illustrated in FIG. 2.

According to the depicted example shown in FIG. 2, each of the first rectangular blocks of pixels and each of the second rectangular blocks of pixels can be 2×2 blocks of pixels. Each rectangular block of pixels can include a pixel from each Bayer domain. Thus, each of the first rectangular blocks of pixels and each of the second rectangular blocks of pixels can include a first green pixel ($G_B$), a blue pixel (B), a red pixel (R), and a second green pixel ($G_R$). The blue pixel (B) and the first green pixel ($G_B$) can be adjacent in a row of the pixel array 102. Moreover, the red pixel (R) and the second green pixel ($G_R$) can be adjacent in a differing row of the pixel array 102. Further, the first green pixel ($G_B$) and the red pixel (R) can be adjacent in a column of the pixel array 102, and the blue pixel (B) and a second green pixel ($G_R$) can be adjacent in a differing column of the pixel array 102. Further, no two rectangular blocks of the first rectangular blocks of pixels are orthogonal in the pixel array 102. Likewise, no two rectangular blocks of the second rectangular blocks of pixels are orthogonal in the pixel array 102.

Assuming the first exposure time differs from the second exposure time, long exposure pixels and short exposure pixels can be captured within the same frame. Moreover, an orthogonal checkerboard pattern of light exposure and dark exposure areas can result. Further, each rectangular block of pixels in the checkerboard pattern is a self-contained resolution block.

With reference to FIG. 3, illustrated is a portion 300 of the pixel array 102 that includes a first subset of the pixels having a first exposure time and a second subset of the pixels having a second exposure time during a common time period (e.g., during which a single contiguous frame of an input image stream is captured), where the first exposure time differs from the second exposure time. The subsets of the pixels of the pixel array 102 having the respective exposure times (e.g., integration times) are spatially arranged according to a zigzag pattern in FIG. 3. Again, the differing exposure times can be controlled by the timing controller 104 as described herein to support spatial exposure multiplexing; thus, the timing controller 104 can control the first subset of the pixels in the pixel array 102 to have the first exposure time and the second subset of the pixels in the pixel array 102 to have the second exposure time during the common time period.

As illustrated in FIG. 3, the subsets of the pixels of the pixel array 102 having the differing exposure times are spatially arranged according to a zigzag pattern. Again, the first subset of the pixels in the pixel array 102 triggered for the first exposure time can be represented as shaded boxes in FIG. 3, and the second subset of the pixels in the pixel array 102 triggered for the second exposure time can be represented as white boxes in FIG. 3.

The bold line in FIG. 3 highlights an 8 pixel unit cell layout with four pixels having the first exposure time and four pixels having the second exposure time. Thus, the 8 pixel unit cell can include long exposure pixels and short exposure pixels. The 8 pixel unit cell can include a first non-rectangular unit of pixels (triggered for the first exposure time) and a second non-rectangular unit of pixels (triggered for the second exposure time).

Pursuant to the example depicted in FIG. 3, the first subset of the pixels in the pixel array 102 can include first non-rectangular units of pixels and the second subset of the pixels in the pixel array 102 can include second non-rectangular units of pixels, where the first non-rectangular units of pixels oppose the second non-rectangular units of pixels to form the zigzag pattern in the pixel array 102. Moreover, each of the first non-rectangular units of pixels and each of the second non-rectangular units of pixels are L-shaped and include three adjacent pixels in a row of the pixel array 102 and a fourth pixel in an adjacent row of the pixel array 102. Thus, as depicted, a first non-rectangular unit of pixels can include a blue pixel (B), two green pixels (two $G_R$s), and a red pixel (R). The two green pixels and the red pixel can be adjacent in a row of the pixel array 102 ($G_R$-R-$G_R$) and the blue pixel (B) can be adjacent to one of the green pixels ($G_R$) in a column of the pixel array 102. Moreover, a second non-rectangular unit of pixels can include a red pixel (R), two green pixels (two $G_B$s), and a blue pixel (B), where the green pixels and the blue pixel are adjacent pixels in a row of the pixel array 102 ($G_B$-B-$G_B$) and the red pixel (R) is adjacent to one of the green pixels ($G_B$) in a column of the pixel array 102.

It is contemplated that either the zigzag pattern as shown in FIG. 3 or the checkerboard pattern as shown in FIG. 2 can be utilized by the image sensor 100 if implementing spatial exposure multiplexing (e.g., one of the patterns can be employed). However, other alternative patterns are intended to fall within the scope of the hereto appended claims.

Figure 4:
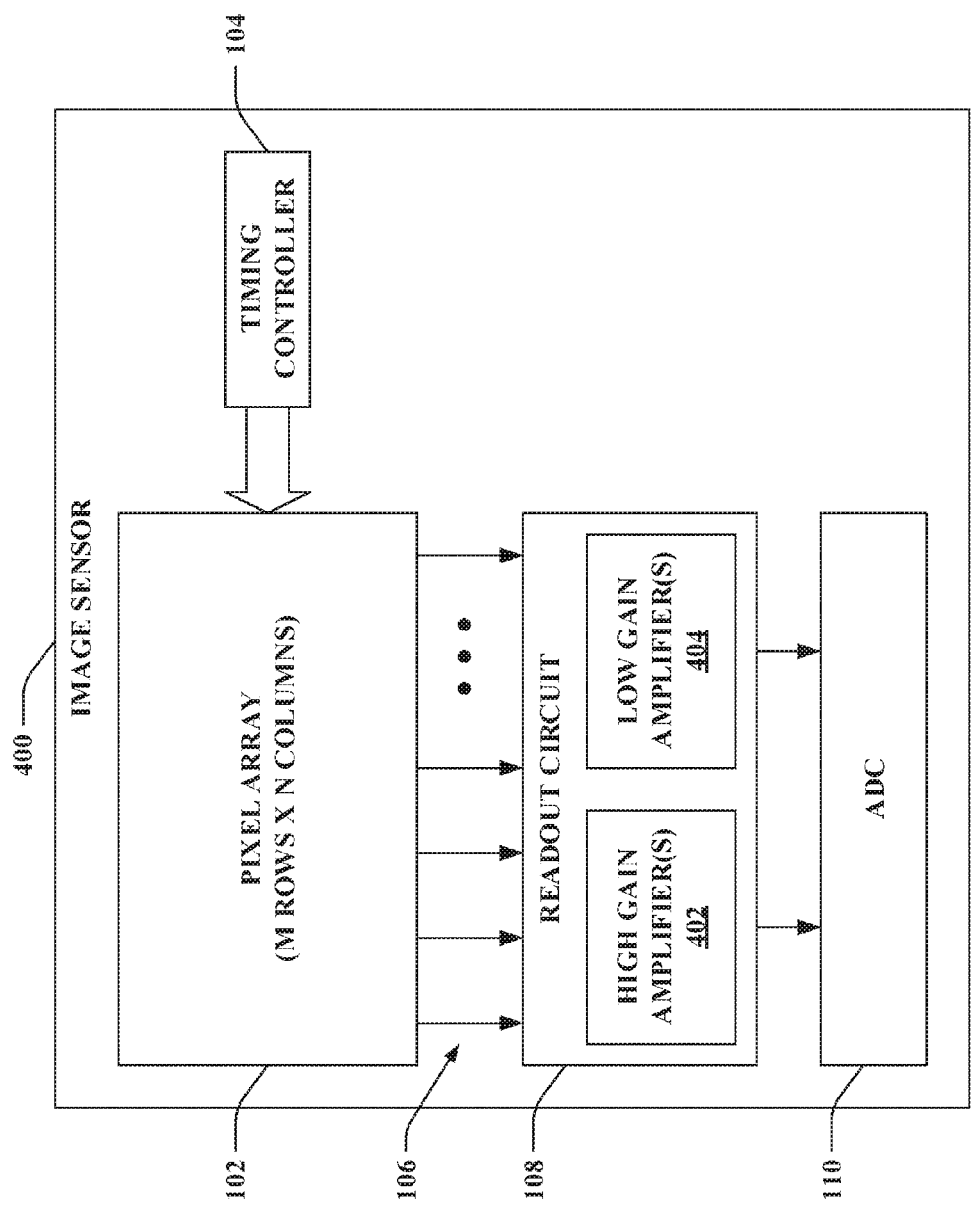
FIG. 4 illustrates a block diagram of another exemplary image sensor.

Referring now to FIG. 4, illustrated is another exemplary image sensor 400 (e.g., the image sensor 100) according to various embodiments. The image sensor 400 supports dual gain operation, allowing the analog-to-digital converter 110 to output two frames of pixel values simultaneously with different gains applied thereto for each frame of an input image stream. The image sensor 400 includes the pixel array 102, the timing controller 104, the read buses 106, the readout circuit 108, and the analog-to-digital converter 110. The readout circuit 108 further includes high gain amplifier(s) 402 and low gain amplifier(s) 404.

The timing controller 104 can be configured to control exposure times of the pixels in the pixel array 102 at least one of temporally or spatially such that an input image stream has two or more differing exposure times. Moreover, the readout circuit 108 can be configured to read out signals from the pixels in the pixel array 102 for the input image stream having the two or more differing exposure times. The readout circuit 108 can further be configured to amplify the signals read out from the pixels in the pixel array 102 by a first analog gain to output first amplified signals for the input image stream having the two or more differing exposure times. Moreover, the readout circuit 108 can be configured to amplify the signals read out from the pixels in the pixel array 102 by a second analog gain to output second amplified signals for the input image stream having the two or more differing exposure times, where the first analog gain differs from the second analog gain. According to an illustration, the high gain amplifier(s) 402 can amplify the signals read out from the pixels in the pixel array 102 by a high analog gain (e.g., the first analog gain), and the low gain amplifier(s) 404 can amplify the signals read out from the pixels in the pixel array 102 by a low analog gain (e.g., the second analog gain). The low analog gain of the low gain amplifier(s) 404 can be tuned to enable rendering a full dynamic range of a pixel (e.g., all of the charge that the pixel is capable of collecting), whereas the high analog gain of the high gain amplifier(s) 402 can be tuned to be noise limited by the pixel (e.g., tuned to render a smallest possible signal that the pixel can sense).

The analog-to-digital converter 110 can further be configured to convert the first amplified signals to first amplified pixel values for the input image stream having the two or more differing exposure times. Moreover, the analog-to-digital converter 110 can be configured to convert the second amplified signals to second amplified pixel values for the input image stream having the two or more differing exposure times.

Figure 5:
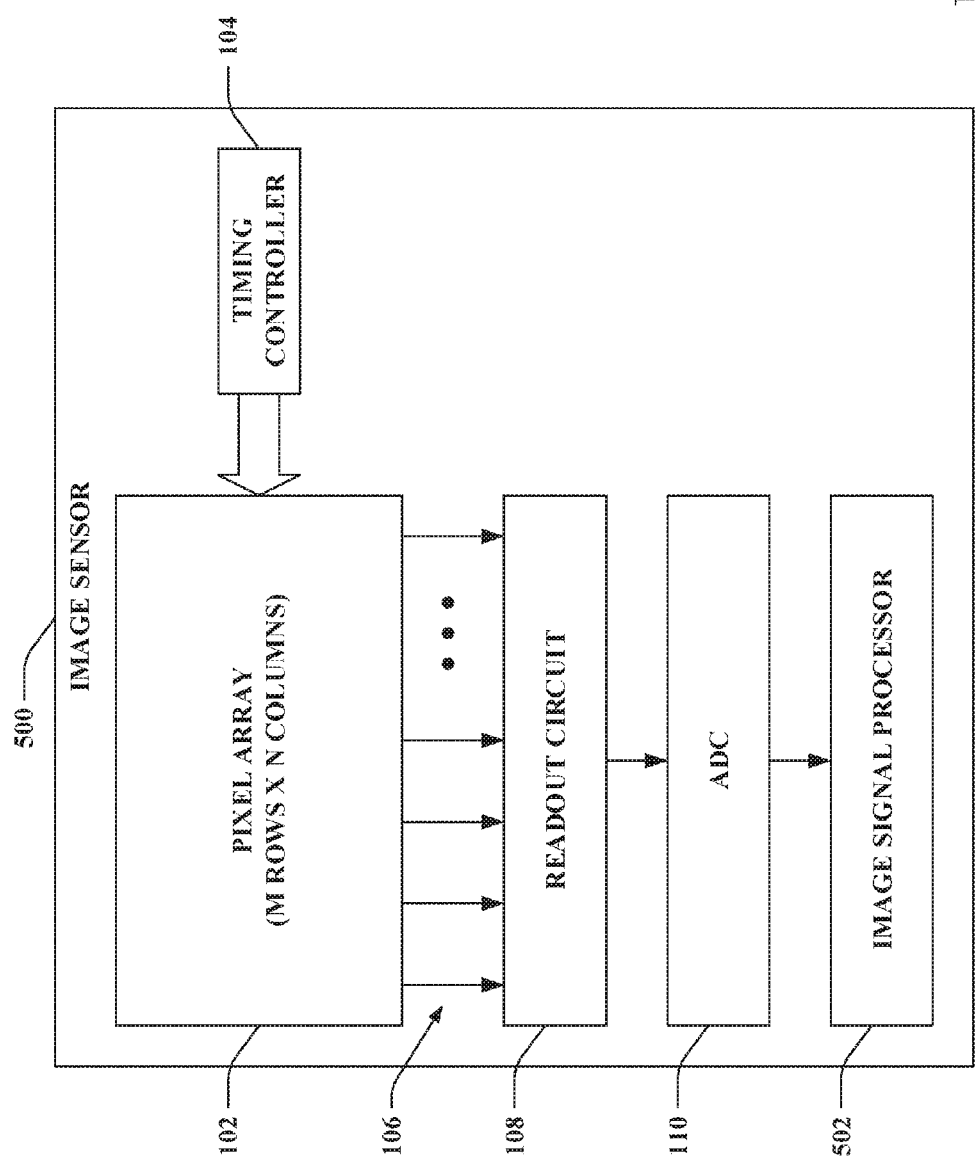
FIG. 5 illustrates a block diagram of yet another exemplary image sensor.

Now turning to FIG. 5, illustrated is another exemplary image sensor 500 (e.g., the image sensor 100) pursuant to various embodiments. Again, the image sensor 500 includes the pixel array 102, the timing controller 104, the read buses 106, the readout circuit 108, and the analog-to-digital converter 110. Although not shown, it is contemplated that the readout circuit 108 can include the high gain amplifier(s) 402 and the low gain amplifier(s) 404.

The image sensor 500 further includes an image signal processor 502. The image signal processor 502 can be configured to generate an output frame based on the pixel values outputted by the analog-to-digital converter 110. For instance, if the image sensor 500 employs temporal exposure multiplexing and spatial exposure multiplexing, then the image signal processor 502 can generate the output frame based on pixel values for two frames (e.g., a first frame and a second frame, successive frames) in an input image stream. According to another example, if the image sensor 500 employs dual gain operation, the image signal processor 502 can generate the output frame based on first amplified pixel values (e.g., amplified by the high gain amplifier(s) 402) for the input image stream having the two or more differing exposure times and second amplified pixel values (e.g., amplified by the low gain amplifier(s) 404) for the input image stream having the two or more differing exposure times. Following this example, the image signal processor 502 can generate the output frame based on the first amplified pixel values and the second amplified pixels values for one frame of the input image stream (assuming temporal exposure multiplexing is not employed) or two frames of the input image stream (assuming temporal exposure multiplexing is employed).

Figure 6:
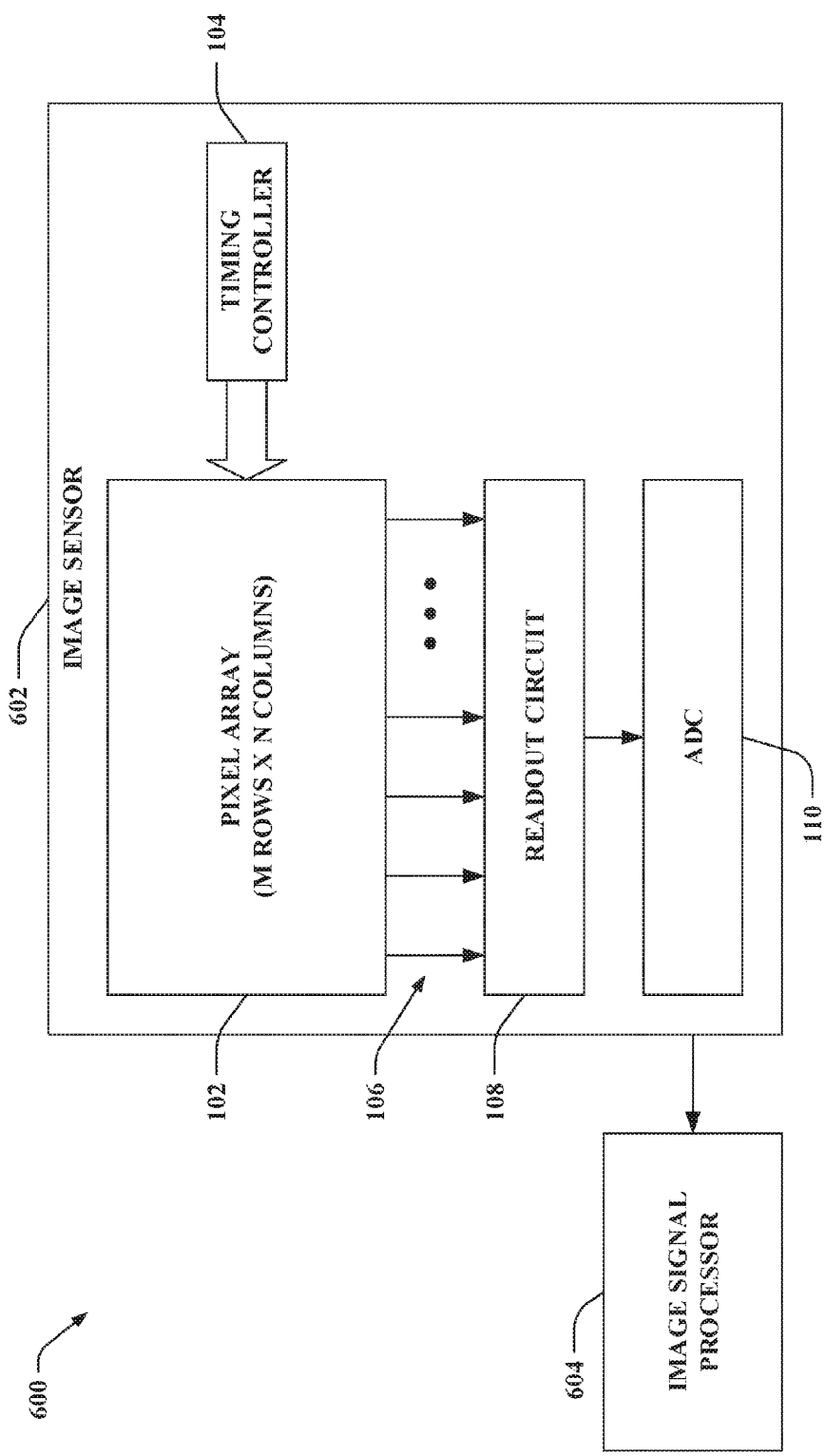
FIG. 6 illustrates a block diagram of an exemplary system that includes an image sensor and an image signal processor.

With reference to FIG. 6, illustrated is an exemplary system 600 that includes an image sensor 602 (e.g., the image sensor 100) and an image signal processor 604. The image sensor 602 includes the pixel array 102, the timing controller 104, the read buses 106, the readout circuit 108, and the analog-to-digital converter 110. Moreover, it is contemplated that the readout circuit 108 can include the high gain amplifier(s) 402 and the low gain amplifier(s) 404.

In the example depicted in FIG. 6, the image signal processor 604 is separate from the image sensor 602, with the image sensor 602 and the image signal processor 604 being in communication with each other. The image sensor 602 can be configured to output pixel values (e.g., from the analog-to-digital converter 110) to the image signal processor 604. Moreover, an output frame can be generated by the image signal processor 604 based on the pixel values obtained from the image sensor 602; accordingly, similar to the image signal processor 502 of FIG. 5, the image signal processor 604 can generate the output frame.

According to an illustration where a combination of at least spatial exposure multiplexing and temporal exposure multiplexing is employed, the image sensor 602 can output the pixel values for the first frame and the second frame in the input image stream to the image signal processor 604. Accordingly, an output frame can be generated by the image signal processor 604 based on the pixel values for the first frame and the second frame of the input image stream.

Pursuant to another illustration where dual gain operation is employed, the image sensor 602 can output the first amplified pixel values for the input image stream having the two or more differing exposure times and the second amplified pixel values for the input image stream having the two or more differing exposure times. Further, the image signal processor 604 can generate an output frame based on the first amplified pixel values and the second amplified pixel values.

Figure 7:
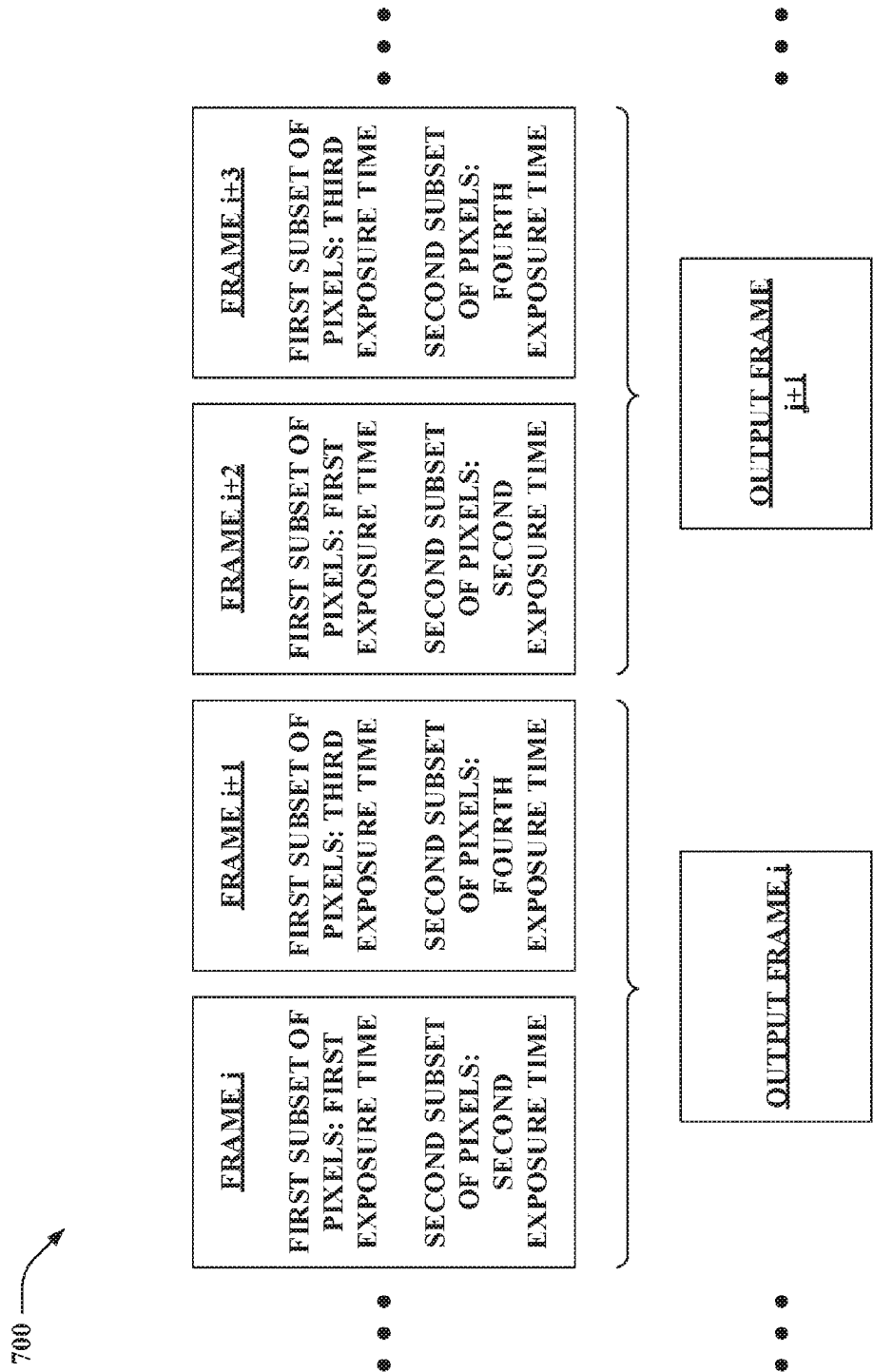
FIG. 7 illustrates an exemplary scenario where an image sensor implements a combination of spatial exposure multiplexing and temporal exposure multiplexing.

FIG. 7 depicts an exemplary scenario 700 where an image sensor (e.g., the image sensor 100, the image sensor 500, the image sensor 602) implements a combination of spatial exposure multiplexing and temporal exposure multiplexing. Following this exemplary scenario 700, the timing controller 104 of the image sensor can control the exposure times of the pixels 102 both temporally and spatially. More particularly, the timing controller 104 can control a first subset of the pixels in the pixel array 102 to have a first exposure time during a first time period. Moreover, the timing controller 104 can control a second subset of the pixels in the pixel array 102 to have a second exposure time during the first time period. A first frame (frame i) of an input image stream can be captured during the first time period. Further, the timing controller 104 can control the first subset of the pixels in the pixel array 102 to have a third exposure time during a second time period, and the timing controller 104 can control the second subset of the pixels in the pixel array 102 to have a fourth exposure time during the second time period. A second frame (frame i+1) of the input image stream can be captured during the second time period. Following this example, the first exposure time, the second exposure time, the third exposure time, and the fourth exposure time differ from each other.

The readout circuit 108 can read out signals from the pixels in the pixel array 102 for the first frame and the second frame of the input image stream. Further, the analog-to-digital converter 110 can convert the signals to pixel values for the first frame and the second frame of the input image stream. Moreover, an image signal processor (e.g., the image signal processor 502, the image signal processor 604) can generate an output frame (output frame j) based on the pixel values for the first frame (frame i) and the second frame (frame i+1) of the input image stream.

It is contemplated that other output frames of an output image stream can similarly be generated (e.g., an output frame j+1 can be generated based on pixel values for frame i+2 and frame i+3). However, it is to be appreciated that a single output frame (output frame j) may be generated as opposed to an output image stream.

Figure 8:
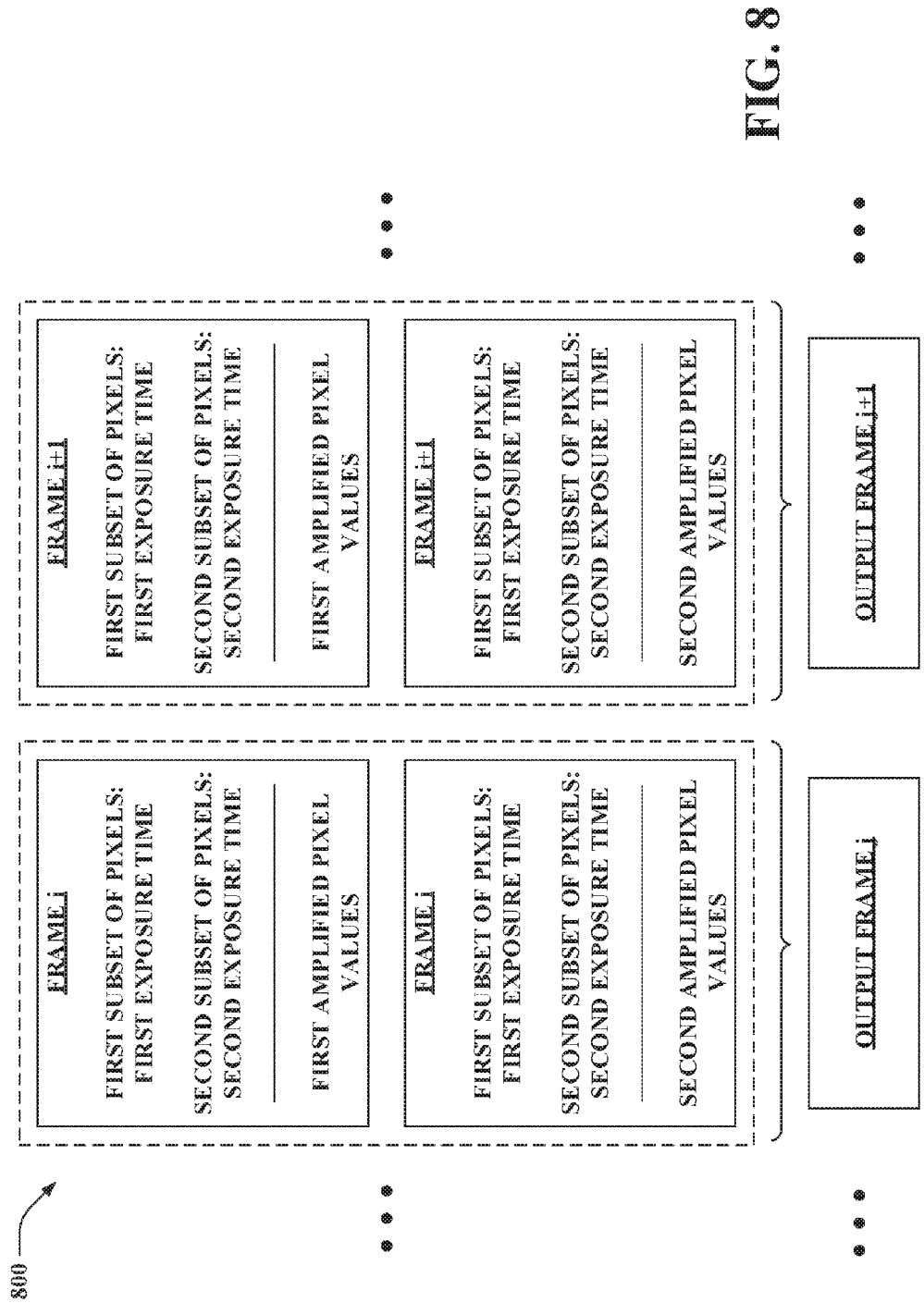
FIGS. 8-10 illustrate exemplary scenarios wherein an image sensor implements a combination of dual gain operation as well as at least one of spatial exposure multiplexing or temporal exposure multiplexing.
Figure 9:
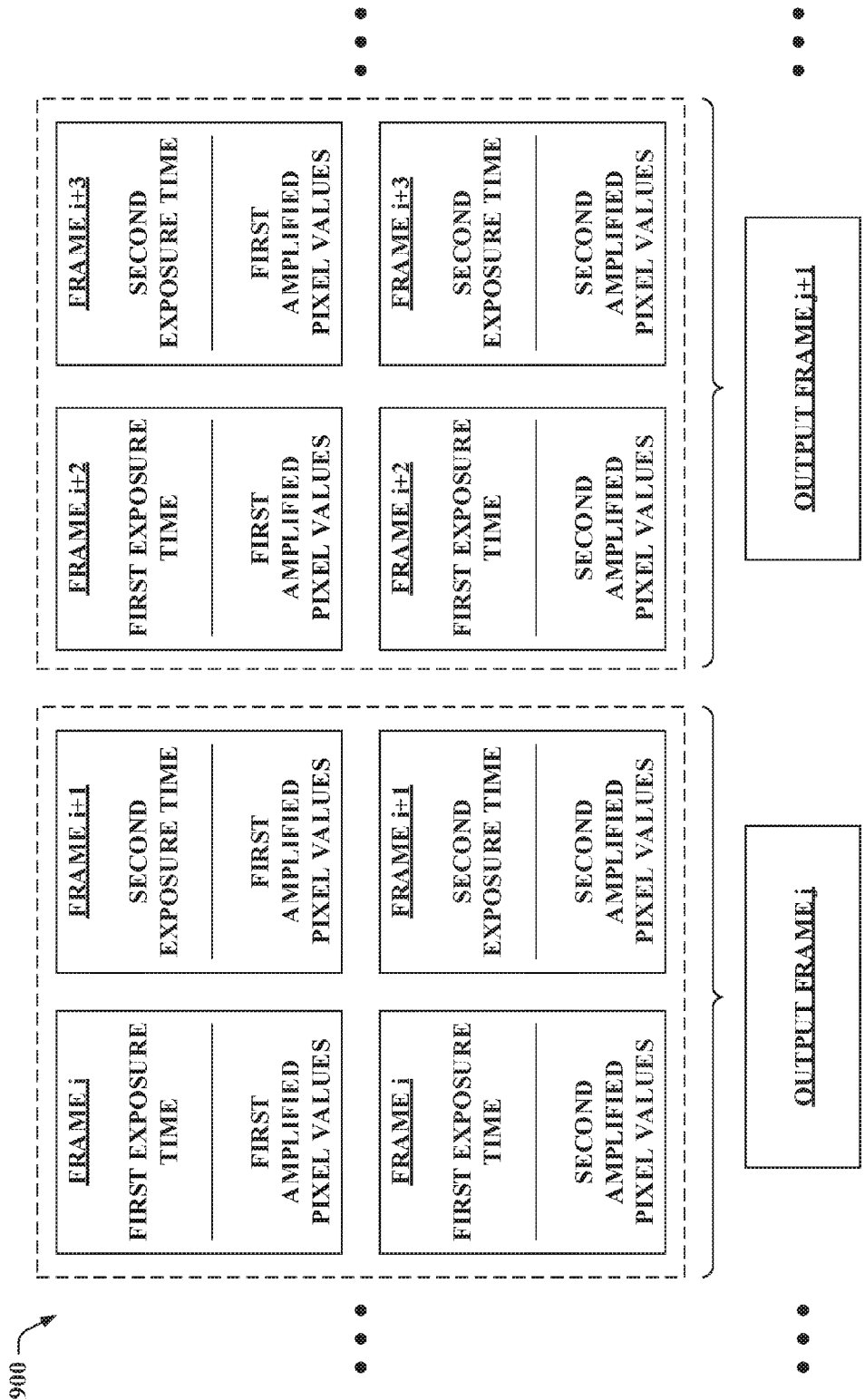
Figure 10:
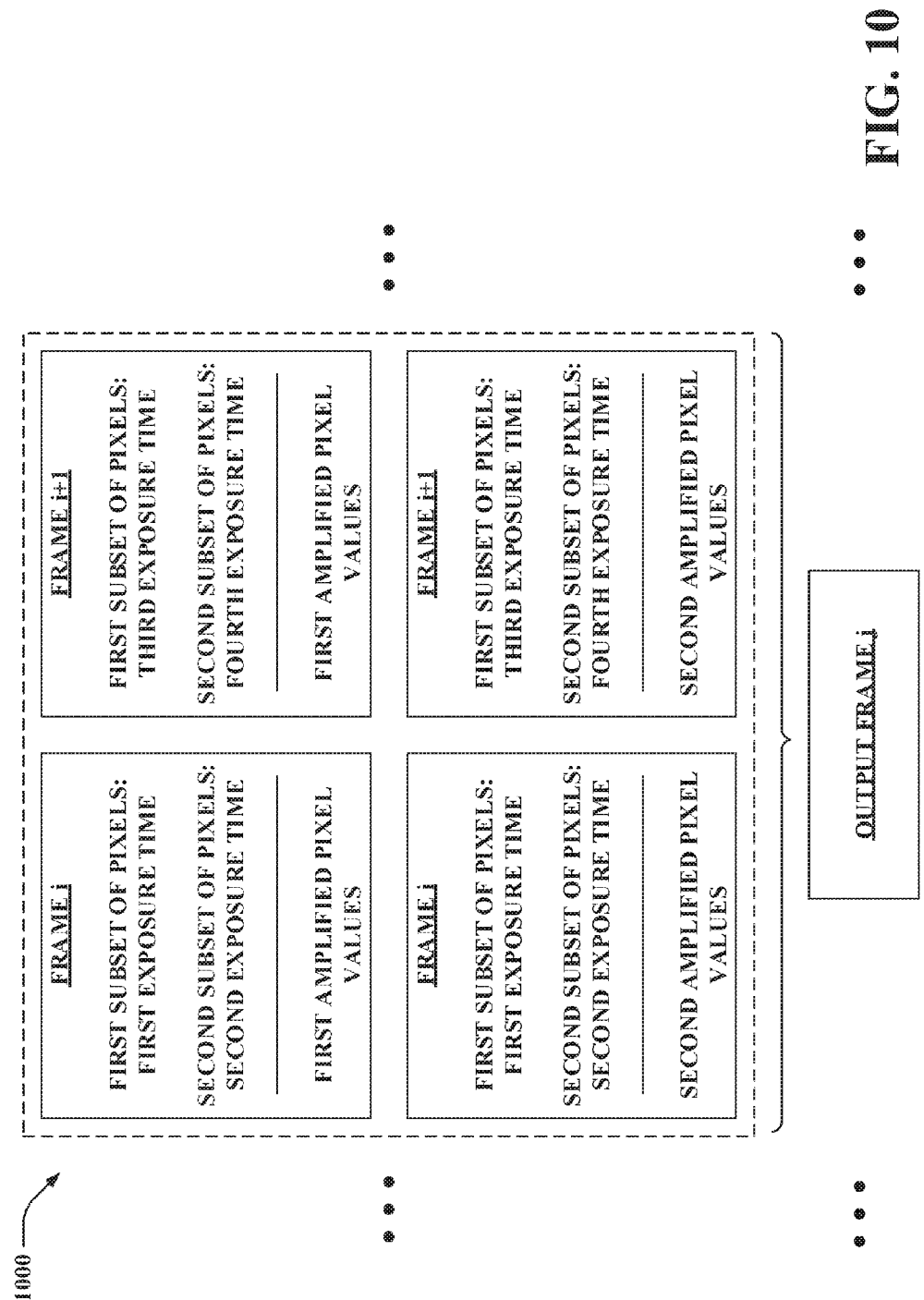

FIGS. 8-10 illustrate exemplary scenarios wherein an image sensor (e.g., the image sensor 100, image sensor 400, the image sensor 500, the image sensor 602) implements a combination of dual gain operation as well as at least one of spatial exposure multiplexing or temporal exposure multiplexing. The timing controller 104 of the image sensor can control the exposure times of the pixels at least one of temporally or spatially such that an input image stream has two or more differing exposure times. Moreover, the readout circuit 108 can read out signals from the pixels in the pixel array 102 for the input image stream having the two or more differing exposure times. The readout circuit 108 (e.g., the high gain amplifier(s) 402) can further amplify the signals read out from the pixels in the pixel array 102 by a first analog gain to output first amplified signals for the input image stream having the two or more differing exposure times. Moreover, the readout circuit 108 (e.g., the low gain amplifier(s) 404) can amplify the signals read out from the pixels in the pixel array 102 by a second analog gain to output second amplified signals for the input image stream having the two or more differing exposure times, where the first analog gain differs from the second analog gain. The analog-to-digital converter 110 of the image sensor can convert the first amplified signals to first amplified pixel values for the input image stream having the two or more differing exposure times. The analog-to-digital converter 110 can further convert the second amplified signals to second amplified pixel values for the input image stream having the two or more differing exposures times. An output frame can be generated by an image signal processor (e.g., the image signal processor 502, the image signal processor 604) based on the first amplified pixel values for the input image stream having the two or more differing exposure times and the second amplified pixel values for the input image stream having the two or more differing exposure times.

Referring now to FIG. 8, illustrated is an exemplary scenario 800 where the image sensor implements a combination of spatial exposure multiplexing and dual gain operation. Accordingly, the timing controller 104 of the image sensor can control a first subset of the pixels in the pixel array 102 to have a first exposure time during a first time period. Moreover, the timing controller 104 can control a second subset of the pixels in the pixel array 102 to have a second exposure time during the first time period. A first frame (frame i) of an input image stream can be captured during the first time period. Moreover, the first exposure time and the second exposure time differ from each other.

The readout circuit 108 can read out signals from the pixels in the pixel array 102 for the first frame of the input image stream. Further, the readout circuit 108 can amplify the signals read out from the pixels by a first analog gain to output first amplified signals, and can amplify the signals read out from the pixels by a second analog gain to output second amplified signals. The analog-to-digital converter 110 can convert the first amplified signals to first amplified pixel values, and convert the second amplified signals to second amplified pixel values. The image signal processor can further generate an output frame (output frame j) based on the first amplified pixel values and the second amplified pixel values for the first frame (frame i) of the input image stream.

Other output frames of an output image stream can similarly be generated (e.g., an output frame j+1 can be generated based on first amplified pixel values and second amplified pixel values for frame i+1). However, it is to be appreciated that a single output frame (output frame j) may be generated as opposed to an output image stream.

Now turning to FIG. 9, illustrated is an exemplary scenario 900 where the image sensor implements a combination of temporal exposure multiplexing and dual gain operation. The timing controller 104 of the image sensor can control the pixels in the pixel array 102 to have a first exposure time during a first time period, where a first frame (frame i) of an input image stream is captured during the first time period. Moreover, the timing controller 104 can control the pixels in the pixel array 102 to have a second exposure time during a second time period, where a second frame (frame i+1) of the input image stream is captured during the second time period. Again, the first exposure time and the second exposure time differ from each other.

The readout circuit 108 can read out signals from the pixels in the pixel array 102 for the first frame of the input image stream, and amplify the signals read out for the first frame by both the first analog gain and the second analog gain in parallel to respectively output first amplified signals and second amplified signals for the first frame. The analog-to-digital converter 110 can convert the first amplified signals to first amplified pixels values for the first frame, and convert the second amplified signals to second amplified pixel values for the first frame. The readout circuit 108 can similarly read out signals from the pixels in the pixel array 102 for the second frame of the input image stream, and amplify the signals by both the first analog gain and the second analog gain in parallel. Likewise, the analog-to-digital converter 110 can output first amplified pixel values for the second frame and second amplified pixel values for the second frame. Moreover, the image signal processor can generate an output frame (output frame j) based on the first amplified pixel values and the second amplified pixel values for the first frame (frame i) of the input image stream and the first amplified pixel values and the second amplified pixel values for the second frame (frame i+1) of the input image stream.

It is contemplated that other output frames of an output image stream can similarly be generated (e.g., an output frame j+1 can be generated based on first amplified pixel values and second amplified pixel values for frame i+2 and first amplified pixel values and second amplified pixel values for frame i+3). Yet, again, it is to be appreciated that a single output frame (output frame j) may be generated rather than an output image stream.

With reference to FIG. 10, illustrated is an exemplary scenario 1000 where the image sensor implements a combination of spatial exposure multiplexing, temporal exposure multiplexing, and dual gain operation. Similar to the example set forth in FIG. 7, the timing controller 104 of the image sensor can control the exposure times of the pixels 102 both temporally and spatially. Moreover, similar to the examples described in FIGS. 8-9, the signals read out from the pixels in the pixel array 102 can be amplified by two analog gains in parallel. Accordingly, first amplified pixel values and second amplified pixel values for a first frame (frame i) and first amplified pixel values and second amplified pixel values for a second frame (frame i+1) can be stitched together by the image signal processor to generate an output frame (output frame j).

Figure 11:
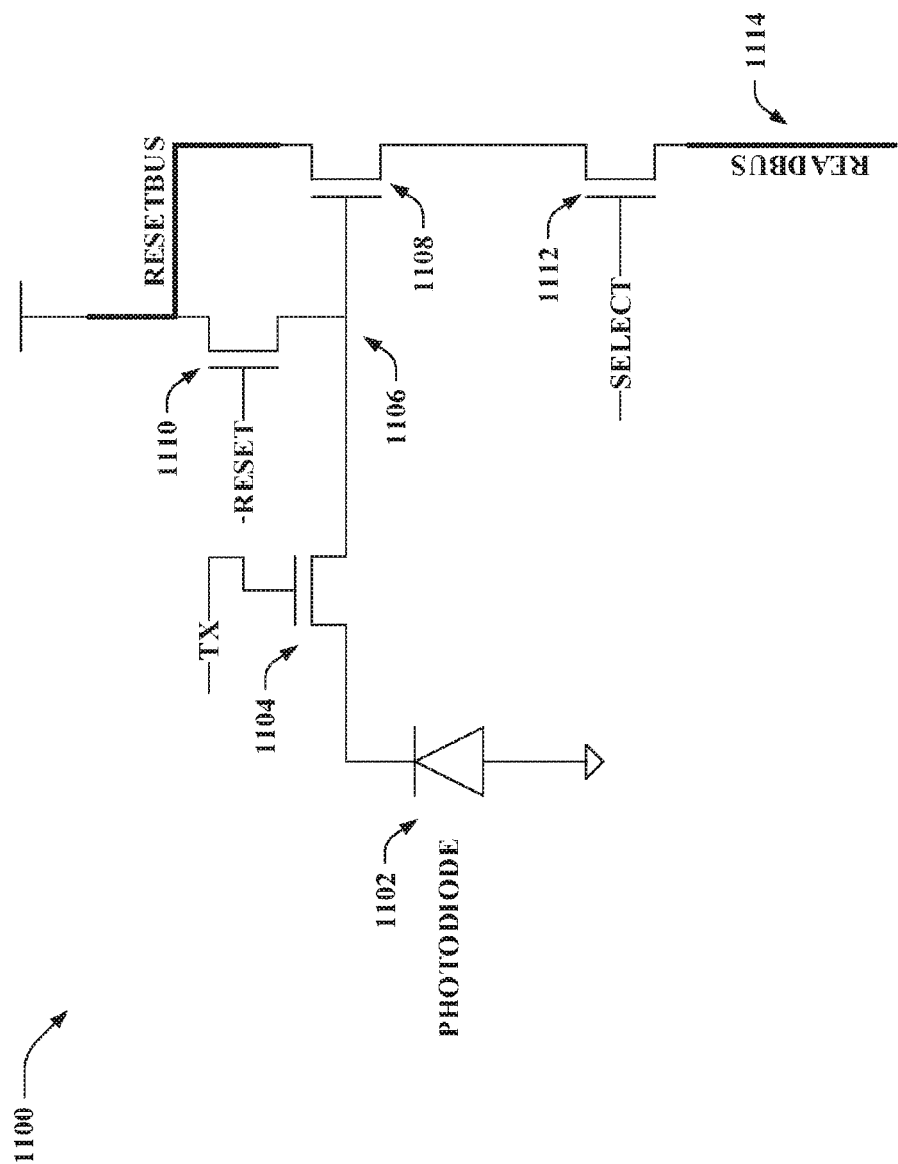
FIG. 11 illustrates an exemplary CMOS image sensor pixel that can be included in a pixel array.

Now turning to FIG. 11, illustrated is an exemplary CMOS image sensor pixel 1100 that can be included in the pixel array 102. The pixel 1100 as depicted is a 4 T pixel cell. The pixel 1100 includes a photodiode 1102 connected to a transfer transistor 1104. The transfer transistor 1104 is further connected to a floating diffusion region 1106. The floating diffusion region 1106 connects to a source follower transistor 1108 and a reset transistor 1110. The source follower transistor 1108 is further connected to a select transistor 1112. The select transistor 1112 can be employed to select a particular row of pixel cells from the pixel array 102. For instance, a select signal can be received at a gate of the select transistor 1112 to read out a value from the floating diffusion region 1106.

The photodiode 1102 can be charged by converting optical energy to electrical energy. For instance, the photodiode 1102 can have sensitivity to a particular type of incident light (e.g., red light, blue light, green light). Yet, it is to be appreciated that the claimed subject matter is not so limited.

According to an illustration, the floating diffusion region 1106 can be reset to a known state before transfer of charge to it. Resetting of the floating diffusion region 1106 can be effectuated by the reset transistor 1110. For example, a reset signal can be received at a gate of the reset transistor 1110 to cause resetting of the floating diffusion region 1106. Further, the transfer transistor 1104 can transfer charge (e.g., provided by the photodiode 1102) to the floating diffusion region 1106. The charge can be transferred based upon a transfer signal (TX) received at a gate of the transfer transistor 1104. Light can be integrated at the photodiode 1102 and electrons generated from the light can be transferred to the floating diffusion region 1106 (e.g., in a noiseless or substantially noiseless manner) when the TX is received at the transfer transistor 1104. Moreover, the pixel 1100 (along with other pixel(s) in the same row of the pixel array 102) can be selected for readout by employing the select transistor 1112. Readout can be effectuated via a read bus 1114. Further, the source follower transistor 1108 can output and/or amplify a signal representing a reset voltage (e.g., provided via a reset bus) and a pixel signal voltage based on the photo converted charges.

It is to be appreciated, however, that different pixel configurations other than the example illustrated in FIG. 11 are intended to fall within the scope of the hereto appended claims. For instance, a disparate pixel configuration can lack the transfer gate transistor 1104 (e.g., a 3 T pixel). According to another illustration, a differing pixel configuration can include more than four transistors. Yet, it is to be appreciated that the claimed subject matter is not limited to the aforementioned examples.

Figure 12:
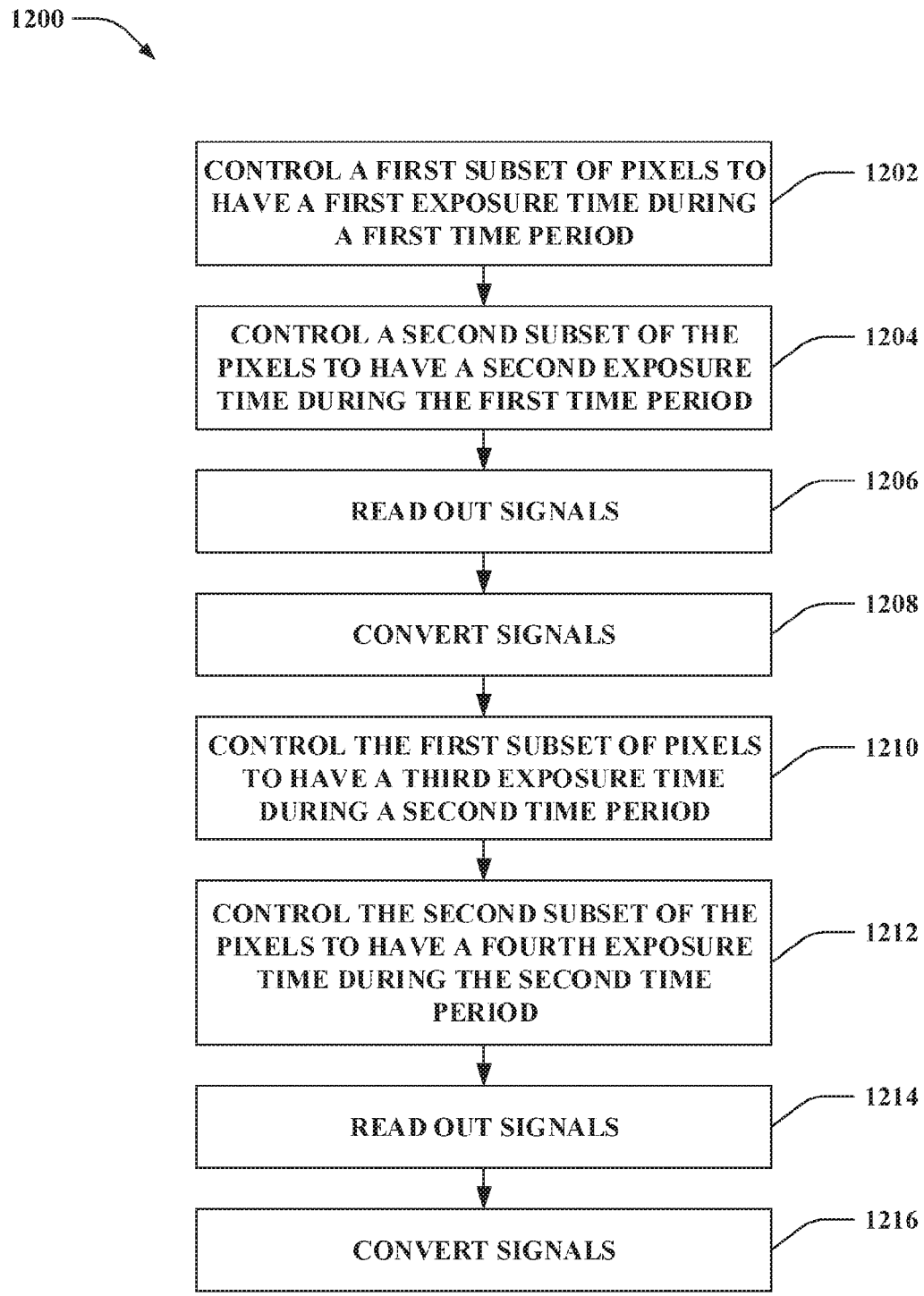
FIG. 12 is a flow diagram that illustrates an exemplary methodology of increasing dynamic range of an image sensor.
Figure 13:
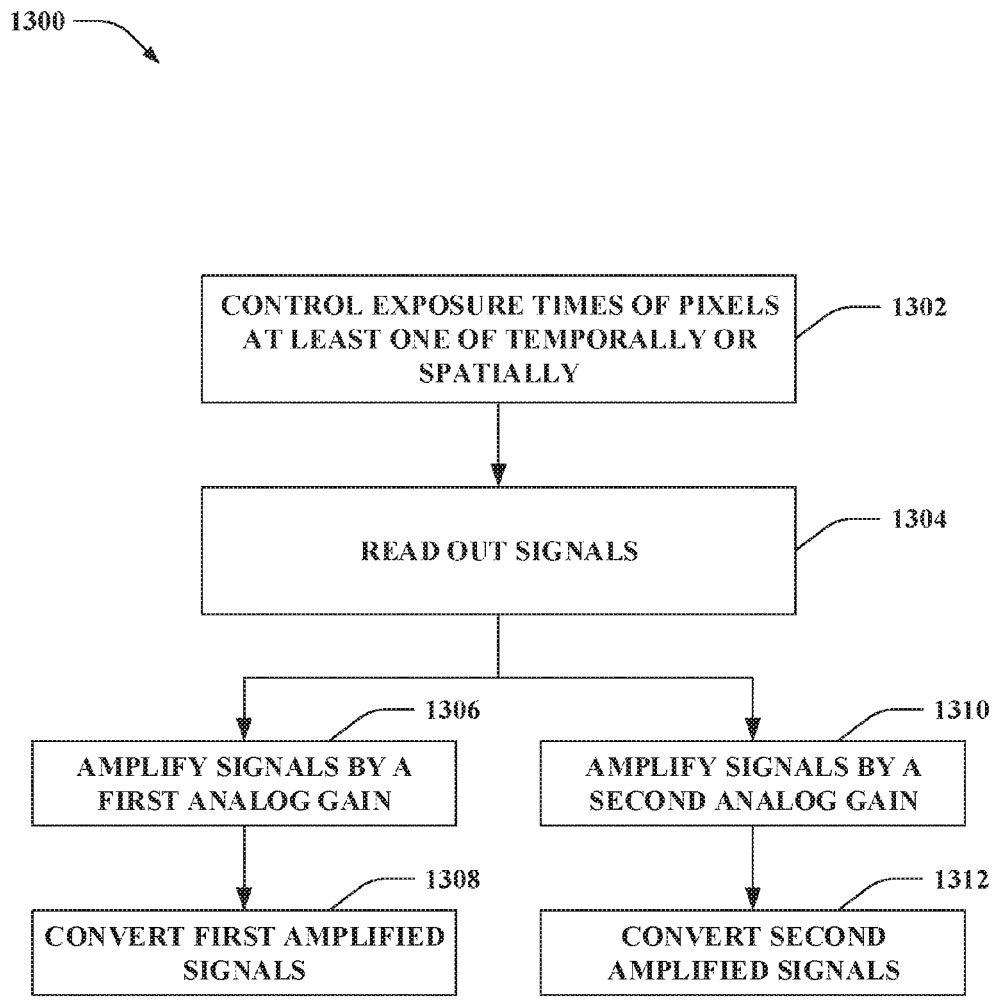
FIG. 13 is a flow diagram that illustrates another exemplary methodology of increasing dynamic range of an image sensor.

FIGS. 12-13 illustrate exemplary methodologies relating to increasing dynamic range of an image sensor. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The acts described herein may be implemented by an image sensor or an image signal processor. Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 12 illustrates a methodology 1200 of increasing dynamic range of an image sensor. The image sensor includes a pixel array, and the pixel array includes pixels. At 1202, a first subset of the pixels in the pixel array can be controlled to have a first exposure time during a first time period, where a first frame of an input image stream is captured during the first time period. At 1204, a second subset of the pixels in the pixel array can be controlled to have a second exposure time during the first time period. At 1206, signals can be read out from the pixels in the pixel array for the first frame of the input image stream. At 1208, the signals for the first frame can be converted to digital pixel values for the first frame of the input image stream. At 1210, the first subset of the pixels in the pixel array can be controlled to have a third exposure time during a second time period, where a second frame of the input image stream is captured during the second time period. At 1212, the second subset of the pixels in the pixel array can be controlled to have a fourth exposure time during the second time period. At 1214, signals can be read out from the pixels in the pixel array for the second frame of the input image stream. At 1216, the signals for the second frame can be converted to digital pixel values for the second frame of the input image stream. Moreover, an output frame can be generated based on the digital pixel values for the first frame of the input image stream and the digital pixel values for the second frame of the input image stream.

Turning to FIG. 13, illustrated is another methodology 1300 of increasing the dynamic range of the image sensor. At 1302, exposure times of the pixels in the pixel array can be controlled at least one of temporally or spatially. Accordingly, an input image stream has two or more differing exposure times. At 1304, signals can be read out from the pixels in the pixel array for the input image stream having the two or more differing exposure times. The methodology 1300 can continue in parallel to 1306 and 1310. More particularly, at 1306, the signals read out from the pixels in the pixel array can be amplified by a first analog gain to output first amplified signals for the input image stream having the two or more differing exposure times. At 1308, the first amplified signals can be converted to first amplified digital pixel values for the input image stream having the two or more differing exposure times. At 1310, the signals read out from the pixels in the pixel array can be amplified by a second analog gain to output second amplified signals for the input image stream having the two or more differing exposure times. At 1312, the second amplified signals can be converted to second amplified digital pixel values for the input image stream having the two or more differing exposure times. Moreover, an output frame can be generated based on the first amplified digital pixel values for the input image stream having the two or more differing exposure times and the second amplified digital pixel values for the input image stream having the two or more differing exposure times.

Figure 14:
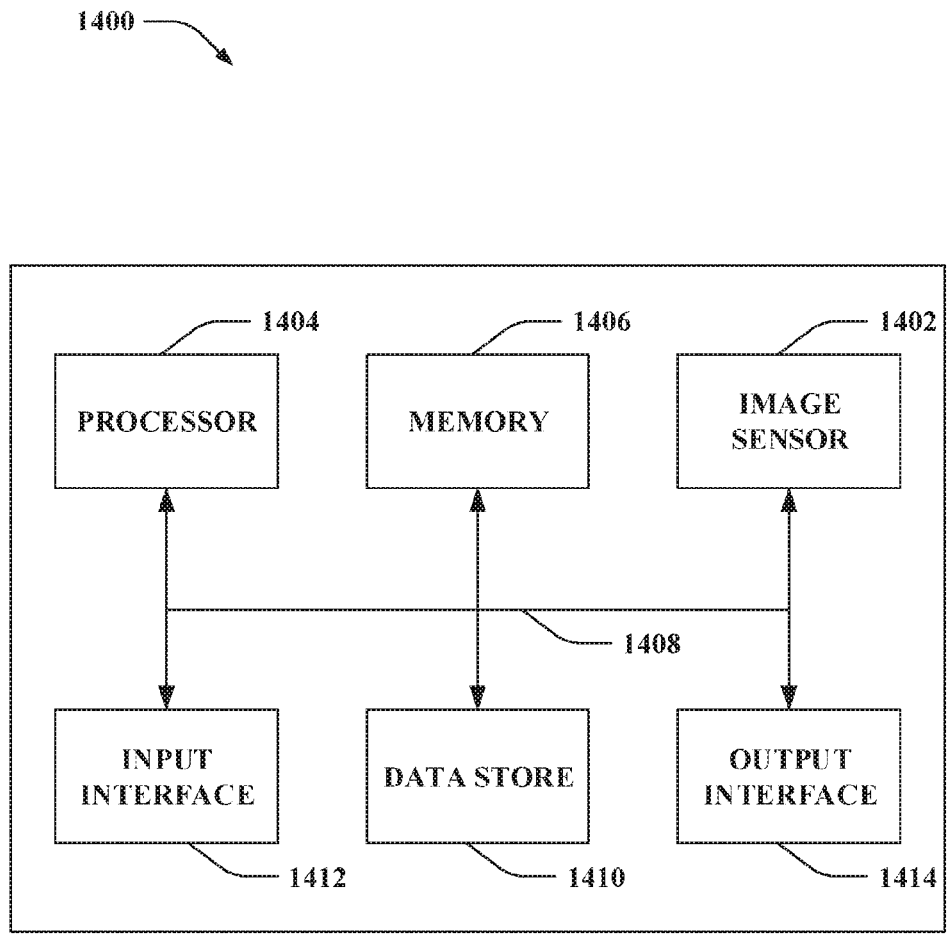
FIG. 14 illustrates an exemplary computing device.

Referring now to FIG. 14, a high-level illustration of an exemplary computing device 1400 that can be used in accordance with the systems and methodologies disclosed herein is illustrated. The computing device 1400 may include an image sensor 1402 (e.g., the image sensor 100, the image sensor 400, the image sensor 500, the image sensor 602). For instance, the image sensor 1402 can be part of a camera of the computing device 1400. However, according to other examples, it is contemplated that the image sensor 1402 can be separate from the computing device 1400. The computing device 1400 further includes at least one processor 1404 that executes instructions that are stored in memory 1406. The processor 1404 may access the memory 1406 by way of a system bus 1408.

The computing device 1400 additionally includes a data store 1410 that is accessible by the processor 1404 by way of the system bus 1408. The data store 1410 may include executable instructions, etc. The computing device 1400 also includes an input interface 1412 that allows external devices to communicate with the computing device 1400. For instance, the input interface 1412 may be used to receive instructions from an external computer device, from a user, etc. The computing device 1400 also includes an output interface 1414 that interfaces the computing device 1400 with one or more external devices. For example, the computing device 1400 may display text, images, etc. by way of the output interface 1414.

Additionally, while illustrated as a single system, it is to be understood that the computing device 1400 may be a distributed system. Thus, for instance, several devices may be in communication by way of a network connection and may collectively perform tasks described as being performed by the computing device 1400.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An image sensor, comprising:
a pixel array that comprises pixels;
a timing controller configured to control exposure times of the pixels in the pixel array, the timing controller configured to:
control a first subset of the pixels in the pixel array to have a first exposure time during a first time period, wherein a first frame of an input image stream is captured during the first time period;
control a second subset of the pixels in the pixel array to have a second exposure time during the first time period;
control the first subset of the pixels in the pixel array to have a third exposure time during a second time period, wherein a second frame of the input image stream is captured during the second time period; and
control the second subset of the pixels in the pixel array to have a fourth exposure time during the second time period;
wherein the first exposure time, the second exposure time, the third exposure time, and the fourth exposure time differ from each other;
a readout circuit configured to read out signals from the pixels in the pixel array for the first frame and the second frame of the input image stream; and
an analog-to-digital converter configured to convert the signals to pixel values for the first frame and the second frame of the input image stream;
wherein the first subset of the pixels in the pixel array comprise first non-rectangular units of pixels;
wherein the second subset of the pixels in the pixel array comprise second non-rectangular units of pixels;
wherein the first non-rectangular units of pixels oppose the second non-rectangular units of pixels to form a zigzag pattern in the pixel array; and
wherein each of the first non-rectangular units of pixels and each of the second non-rectangular units of pixels are L-shaped and comprise three adjacent pixels in a row of the pixel array and a fourth pixel in an adjacent row of the pixel array.

2. The image sensor of claim 1, further comprising:
an image signal processor configured to generate an output frame based on the pixel values for the first frame and the second frame of the input image stream.

3. The image sensor of claim 1, wherein:
the image sensor is configured to output the pixel values for the first frame and the second frame of the input image stream to an image signal processor; and
an output frame is generated by an image signal processor based on the pixel values for the first frame and the second frame of the input image stream.

4. The image sensor of claim 1, wherein:
the readout circuit is further configured to:
amplify the signals read out from the pixels in the pixel array by a first analog gain to output first amplified signals for the first frame and the second frame of the input image stream; and
amplify the signals read out from the pixels in the pixel array by a second analog gain to output second amplified signals for the first frame and the second frame of the input image stream, wherein the first analog gain differs from the second analog gain; and
the analog-to-digital converter is further configured to:
convert the first amplified signals to first amplified pixel values for the first frame and the second frame of the input image stream; and
convert the second amplified signals to second amplified pixel values for the first frame and the second frame of the input image stream.

5. The image sensor of claim 4, further comprising:
an image signal processor configured to generate an output frame based on:
the first amplified pixel values for the first frame and the second frame of the input image stream; and
the second amplified pixel values for the first frame and the second frame of the input image stream.

6. The image sensor of claim 4, wherein:
the image sensor is configured to output:
the first amplified pixel values for the first frame and the second frame of the input image stream; and
the second amplified pixel values for the first frame and the second frame of the input image stream; and
an output frame is generated by an image signal processor based on:
the first amplified pixel values for the first frame and the second frame of the input image stream; and the second amplified pixel values for the first frame and the second frame of the input image stream.

7. An image sensor, comprising:
a pixel array that comprises pixels, wherein the pixel array comprises a first subset of the pixels and a second subset of the pixels, wherein the first subset of the pixels in the pixel array comprise first non-rectangular units of pixels, wherein the second subset of the pixels in the pixel array comprise second non-rectangular units of pixels, wherein the first non-rectangular units of pixels oppose the second non-rectangular units of pixels to form a zigzag pattern in the pixel array, and wherein each of the first non-rectangular units of pixels and each of the second non-rectangular units of pixels are L-shaped and comprise three adjacent pixels in a row of the pixel array and a fourth pixel in an adjacent row of the pixel array;
a timing controller configured to control exposure times of the pixels in the pixel array, the timing controller configured to control the exposure times of the pixels at least one of temporally or spatially such that an input image stream has two or more differing exposure times;
a readout circuit configured to:
read out signals from the pixels in the pixel array for the input image stream having the two or more differing exposure times;
amplify the signals read out from the pixels in the pixel array by a first analog gain to output first amplified signals for the input image stream having the two or more differing exposure times; and
amplify the signals read out from the pixels in the pixel array by a second analog gain to output second amplified signals for the input image stream having the two or more differing exposure times, wherein the first analog gain differs from the second analog gain; and
an analog-to-digital converter configured to:
convert the first amplified signals to first amplified pixel values for the input image stream having the two or more differing exposure times; and
convert the second amplified signals to second amplified pixel values for the input image stream having the two or more differing exposure times.

8. The image sensor of claim 7, the timing controller being configured to control the exposure times of the pixels temporally comprises the timing controller being configured to:
control the pixels in the pixel array to have a first exposure time during a first time period, wherein a first frame of the input image stream is captured during the first time period; and
control the pixels in the pixel array to have a second exposure time during a second time period, wherein a second frame of the input image stream is captured during the second time period;
wherein the first exposure time and the second exposure time differ from each other.

9. The image sensor of claim 7, the timing controller being configured to control the exposure times of the pixels spatially comprises the timing controller being configured to:
control the first subset of the pixels in the pixel array to have a first exposure time during a time period, wherein a frame of the input image stream is captured during the time period; and
control the second subset of the pixels in the pixel array to have a second exposure time during the time period; and
wherein the first exposure time and the second exposure time differ from each other.

10. The image sensor of claim 7, the timing controller being configured to control the exposure times of the pixels both temporally and spatially comprises the timing controller being configured to:
control the first subset of the pixels in the pixel array to have a first exposure time during a first time period, wherein a first frame of the input image stream is captured during the first time period;
control the second subset of the pixels in the pixel array to have a second exposure time during the first time period;
control the first subset of the pixels in the pixel array to have a third exposure time during a second time period, wherein a second frame of the input image stream is captured during the second time period; and
control the second subset of the pixels in the pixel array to have a fourth exposure time during the second time period;
wherein the first exposure time, the second exposure time, the third exposure time, and the fourth exposure time differ from each other.

11. The image sensor of claim 7, further comprising:
an image signal processor configured to generate an output frame based on:
the first amplified pixel values for the input image stream having the two or more differing exposure times; and
the second amplified pixel values for the input image stream having the two or more differing exposure times.

12. The image sensor of claim 7, wherein:
an output frame is generated by an image signal processor based on:
the first amplified pixel values for the input image stream having the two or more differing exposure times; and
the second amplified pixel values for the input image stream having the two or more differing exposure times.

13. A method of increasing dynamic range of an image sensor, the image sensor comprising a pixel array that comprises pixels, the method comprising:
controlling a first subset of the pixels in the pixel array to have a first exposure time during a first time period, wherein a first frame of an input image stream is captured during the first time period;
controlling a second subset of the pixels in the pixel array to have a second exposure time during the first time period;
reading out signals from the pixels in the pixel array for the first frame of the input image stream;
converting the signals for the first frame to digital pixel values for the first frame of the input image stream;
controlling the first subset of the pixels in the pixel array to have a third exposure time during a second time period, wherein a second frame of the input image stream is captured during the second time period;
controlling the second subset of the pixels in the pixel array to have a fourth exposure time during the second time period, wherein the first exposure time, the second exposure time, the third exposure time, and the fourth exposure time differ from each other;

reading out signals from the pixels in the pixel array for the second frame of the input image stream; and converting the signals for the second frame to digital pixel values for the second frame of the input image stream;

wherein the first subset of the pixels in the pixel array comprise first non-rectangular units of pixels;

wherein the second subset of the pixels in the pixel array comprise second non-rectangular units of pixels;

wherein the first non-rectangular units of pixels oppose the second non-rectangular units of pixels to form a zigzag pattern in the pixel array; and wherein each of the first non-rectangular units of pixels and each of the second non-rectangular units of pixels are L-shaped and comprise three adjacent pixels in a row of the pixel array and a fourth pixel in an adjacent row of the pixel array.

14. The method of claim 13, further comprising:

generating an output frame based on the digital pixel values for the first frame of the input image stream and the digital pixel values for the second frame of the input image stream.

\* \* \* \* \*